Nov. 18, 1947.  E. L. VIDAL ET AL  2,431,214
LAMINATED STRUCTURE AND METHOD
Original Filed Sept. 12, 1940   2 Sheets-Sheet 1
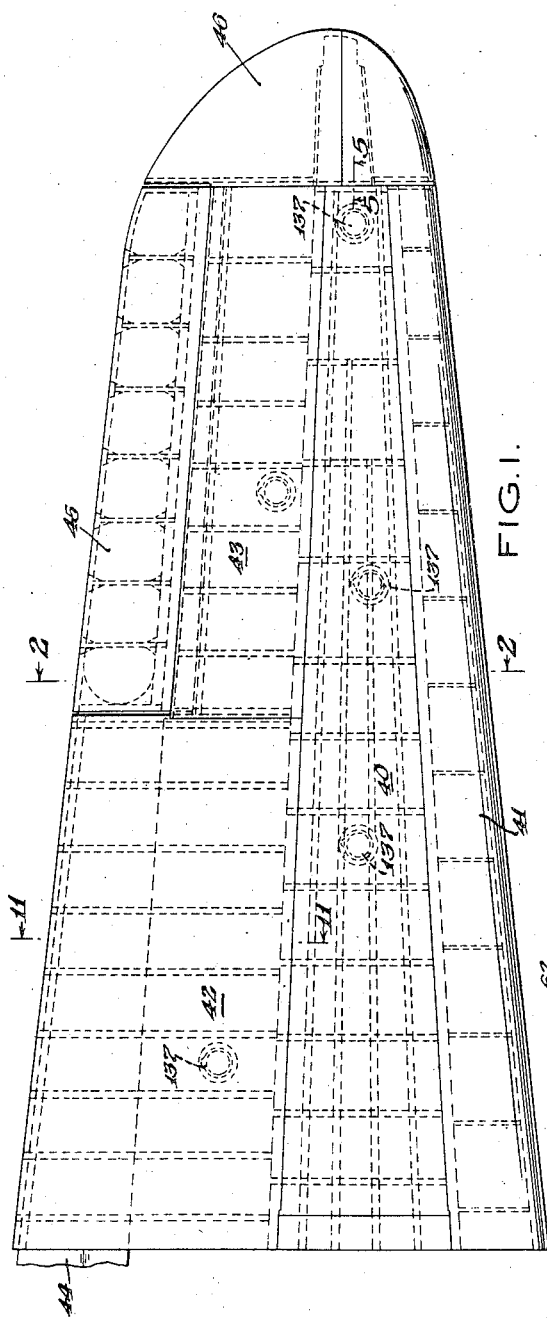
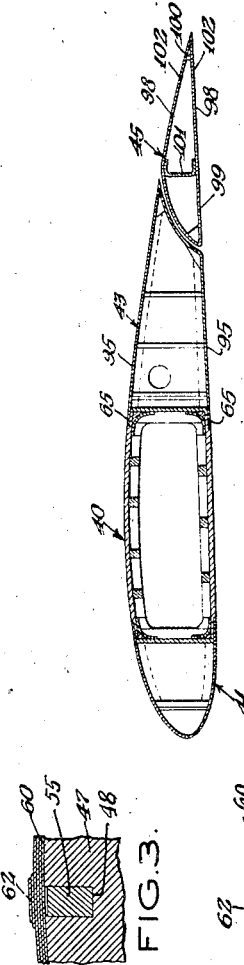
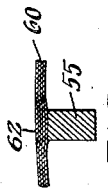
INVENTORS
Eugene L. Vidal and
BY Laurence J. Markoefer
Hobart N. Durham
ATTORNEY INVENTORS
Eugene L. Vidal and
BY Lawrence J. Markhoefer
Hobart N. Durham
ATTORNEY Patented Nov. 18, 1947

2,431,214

UNITED STATES PATENT OFFICE 2,431,214

LAMINATED STRUCTURE AND METHOD

Eugene L. Vidal, New York, N. Y., and Laurence J. Marhoefer, Haddon Heights, N. J., assignors to Vidal Corporation, Camden, N. J., a corporation of Delaware Application November 11, 1943, Serial No. 509,845, which is a division of application Serial No. 356,426, September 12, 1940. Divided and this application May 15, 1945, Serial No. 593,840

4 Claims. (Cl. 20—0.5)

This invention relates to structures fabricated from laminations of adhesively treated material and to methods of making such structures.

An object of the invention is to provide a novel method for eliminating surface irregularities in a reinforced molded structure without decreasing the strength of said structure.

Another object of the invention is to provide a process for making a novel laminated air foil having reinforcing members novelly secured to the skin thereof.

Another object is to form in a novel manner the framework and skin of an airfoil or similar structure.

Another object is to produce an improved, reinforced molded shell structure having a smooth and regular outer surface.

Heretofore the fabrication of laminated structures on molds has resulted in the production of either ridges or hollows in the skin of the structure due to irregularities in the thickness of the reinforcing members, which either fail to fill, or project beyond, the grooves provided therefor. The difficulty of securing a smooth surface in the completed reinforced shell structure is enhanced by the fact that the reinforcing members are usually of wood, or other material, compressible under the substantial fluid pressure to which they, as well as the overlying laminations, are subjected in the molding operation. It is substantially impossible to make the reinforcing members of precisely that thickness that will insure that, when molded, their upper surface shall be precisely flush with the surface of the mold, which heretofore has been a condition precedent to securing a smooth faced shell structure. It is obviously impracticable after molding to fill in any hollow, and while, if a ridge exists, it is possible, by, for example, sandpapering, to smooth the surface to eliminate the ridge, this cannot be done without decreasing the thickness of the laminated skin and thereby substantially decreasing the skin strength.

To overcome these difficulties, without decreasing the skin strength, the reinforcing member is made of such thickness, usually somewhat undersized, that, when molded, its upper surface will terminate slightly below the surface of the mold. Before molding, however, one or more extra strips of laminated material are located in the top lamination of the main skin at each of the grooves containing reinforcing members, the strips being of width equal to or slightly greater than the width of the groove. As a result, when the structure is molded, although a hollow is produced in the main skin of the structure, these extra laminations fill this hollow. This may produce a ridge on the outer surface of the molded structure, but any portion of the extra laminations that projects above the level of the main skin surface may thereupon be removed, for example, by a sandpapering machine, to level off the outer surface of the shell structure without decreasing the skin strength.

The above and other objects and novel features of this invention will more fully appear from the following detailed description when the latter is read in connection with the accompanying drawings. It is to be understood, however, that the drawings are for the purpose of illustration only and are not intended as a definition of the limits of the invention, reference being primarily had for this latter purpose to the appended claims.

In the drawings, wherein like reference characters refer to like parts throughout the several views;

Fig. 1 is a top plan view of an airplane wing fabricated according to the method of the present invention;

Fig. 2 is a sectional view taken substantially along line 2—2 of Fig. 1;

Fig. 3 is a fragmentary sectional view of a reinforcing member located in a mold and the manner of superposing skin laminations on said mold over said member;

Fig. 4 is a view similar to Fig. 3, showing the above parts after molding;

Figure 5:
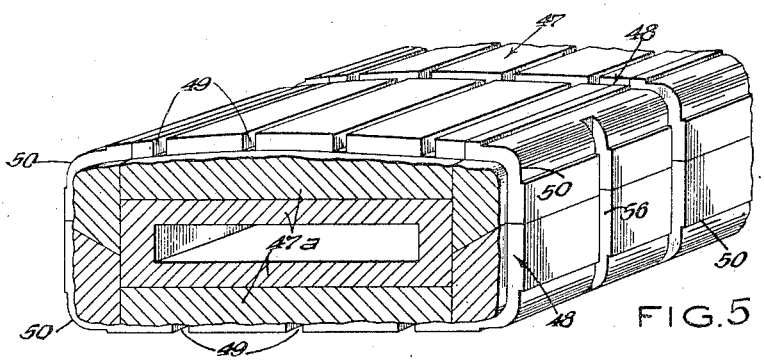
Fig. 5 is a perspective view of a portion of a type of mold or form on which the central part of the wing of Fig. 1 may be fabricated.
Figure 6:
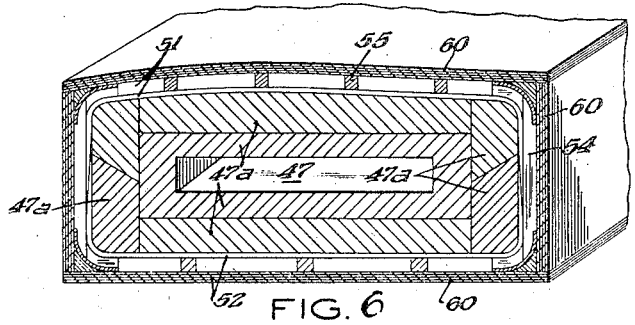
Fig. 6 is a perspective view showing the parts of the wing section assembled on the mold of Fig. 6.

The present application is a division of our copending application Serial No. 509,845, filed November 11, 1943, Patent No. 2,394,730, granted February 12, 1946, which in turn was divided out of our original application Serial No. 356,426, filed September 12, 1940, Patent No. 2,348,316, granted May 9, 1944.

According to the novel method comprehended by the present invention, a structural member, such as an aircraft wing, is novelly formed in one or more sections from a plurality of adhesively treated laminations of a material such as wood veneer. The laminations are shaped and bonded together by a molding operation which preferably includes the application of heat and fluid pressure but which may be accomplished by the application of pressure only. The molded sections are removed from the mold and joined together to form the complete wing structure either mechanically or by a local molding carried out by mechanical presses.

The veneer sheets which are utilized to carry out the method have a thickness which depends on the desired weight, thickness and structural strength of the member being formed therefrom. For example, when a member having a high strength-to-weight ratio is to be formed, thin sheets from 1/45" to 1/8" are used in a sufficient number of layers to give the requisite strength, whereas to form a thick structure requiring little shaping it is satisfactory to employ sheets having a thickness of 1/4" or more. In the fabrication of aircraft parts, such as wings, weight must be maintained at a minimum and, accordingly, thin sheets are used. Furthermore, although solid strips could be used as reinforcing or frame members, it is preferable first to form said strips and other reinforcing members from veneer laminations, a plurality of said members, wherever possible, being molded as a block by the same molding method, from which block the members are sawed or otherwise removed.

The sheets of material are treated with a suitable adhesive, preferably of the thermoplastic or thermosetting group, as, for example, polyvinyl butyral. It is also possible to employ other adhesives, for example, of the type adapted to be set by chemical reaction and requiring the application of pressure only during molding, such as urea formaldehyde.

The adhesive is applied to the sheets, preferably in a sufficient quantity to impregnate and coat the same in any suitable manner, as, for example, by being sprayed or painted thereon or by dipping the sheets in the adhesive. After the adhesive is applied, the sheets are permitted to season for several hours and then if more thorough impregnation and coating are desired the application of the adhesive and the seasoning are repeated one or more times. In the fabrication of a structure having curved surfaces from sheets impregnated with a thermoplastic, it is preferable to mix a plasticizer, such as dibutyl phthalate, with the adhesive in sufficient quantity to make the impregnated sheets sufficiently flexible to enable them to conform substantially to the curved surface, the quantity of plasticizer added to the thermoplastic varying inversely as the radius of curvature of the shape into which the veneer sheets are to be formed.

An aircraft wing fabricated according to the novel method of the present invention is shown by way of illustration in Fig. 1. Said wing comprises a beam section 40 located intermediate the leading and trailing edges of the wing and extending longitudinally, i. e., in the direction of the wing span, for almost the entire length of said span, said beam section constituting the main support for the wing. A leading edge or nose section 41 is secured to the forward edge of beam section 40 and trailing edge or tail sections 42 and 43 are secured to the rear edge of said beam section, trailing edge section 42 having a flap 44 hinged thereon, and section 43 having an aileron 45 associated therewith. A separate tip section 46 is also provided and is adapted to be secured to the end of beam section 40 and to constitute the tip of the wing.

Beam section 40 is formed on a mold 47 (Fig. 5) provided with transverse recesses 48 located where reinforcing frames for the beam are desired and longitudinal grooves or recesses 49 which intersect said transverse recesses and extend substantially the length of the beam, the spacing of recesses 48 and 49 and the length of the latter recesses being determined by the desired strength and rigidity of the beam section. The mold 47 may be provided with rounded edges and is preferably formed in several parts in order to be readily removable from the structure molded thereon. The mold is first rendered non-adhesive by being covered with a non-adhesive material, such as Cellophane or cellulose acetate, or with sheets of veneer that have the surfaces thereof in engagement with said mold free of adhesive. Transverse grooves 48 are then filled with a pair of laminated U-shaped frame members 51 and 52, corner pieces 53 and side pieces 54, said frame members being recessed so as to interlock with strips 55 which are adapted to fill grooves 49 and which are also recessed. Indentations 50 at each edge of mold 47 are filled with arcuate strips 58 which preferably extend the length of said mold and a filler strip 59 to "square off" the edges is provided at each of the mold edges being positioned over each of said arcuate strips. It is preferable to provide a side reinforcing strip between each pair of transverse frames and grooves 56 are provided for this purpose in order to receive side pieces.

Thereafter, a plurality of adhesively treated sheets of veneer 60 are superposed on the four sides of mold 47 and are temporarily secured to the mold by any suitable means, such as cleats or belts (not shown). The aggregate thickness of the veneer layers may progressively diminish toward the beam tip, i. e., some of the layers may terminate at a predetermined distance from the tip.

When the above-described structure is properly assembled on the mold in the above-described manner and the exposed surfaces are rendered non-adhesive, for example, by being coated with cellulose acetate, the assembly and the mold are subjected to a molding operation which includes the application of pressure whereby the laminations are caused to closely conform to the mold shape while the adhesive is actuated and caused to set. This is preferably accomplished by inserting the mold and the assembly thereon into a flexible, substantially impervious container and then placing said container into a pressure chamber wherein said container is preferably subjected to fluid pressure. The interior of the container is in communication with the exterior of the chamber so that the pressure in the latter will exhaust said container and cause the walls thereof to closely engage the laminations on the mold. The pressure is preferably applied by introducing compressed air and/or steam into the chamber, the steam or other heating medium being used when the laminations have been treated with thermoplastic or thermosetting adhesives and heat is desired for activating the adhesive. The pressure remains applied until the adhesive has set and then the mold and the structure molded thereon are removed from the chamber and from the container.

Heretofore the fabrication of reinforced laminated structures on molds has resulted in the production of either ridges or hollows in the skin of the structure due to the irregularities in the thickness of the reinforcing members which either fail to fill or project beyond the grooves provided therefor. To overcome this defect without decreasing the skin strength in the products of the present invention, it is proposed to locate one or more extra strips 62 (Figs. 3 and 4) of laminated material over the top lamination at each of the grooves containing reinforcing members and to use reinforcing members 55, etc., which are somewhat undersized, said strips being of a width substantially equal to or slightly greater than the width of said grooves. As a result, when the structure is molded, although a hollow is provided in the skin of the structure, this hollow is filled with these extra laminations. The portion of the latter which projects beyond the skin surface is thereafter removed without decreasing the skin strength and this removal can be readily accomplished, for example, by a sand-papering machine.

There is thus provided a novel method and product wherein a smooth skin is provided on an airfoil wing or other laminated molded structure even though said wing is molded from laminations of adhesively treated materials and is provided with adhesively secured reinforcing members.

The invention in its broader aspects is not limited to the specific process and steps and article of manufacture shown and described but departures may be made therefrom within the scope of the accompanying claims without departing from the principles of the invention and without sacrificing its chief advantages.

What is claimed is:

1. A method of producing a smooth surfaced unitary reinforced laminated shell structure comprising providing a mold having a recess therein; positioning in said recess an adhesively treated reinforcing member adapted after molding to terminate slightly below the surface of the mold, positioning on the mold over said recess and member adhesively treated laminations adapted to constitute the shell of said structure, applying at least one strip of adhesively treated material, having a width not less than that of the recess, to said laminations over said recess, molding the shell laminations, applied strip or strips and reinforcing member into a unitary reinforced laminated shell structure, and effecting such reduction in the thickness of the strip or strips as may be necessary to make the outer surface thereof flush with the adjacent outer surface of the shell structure.

2. A method of forming a smooth surfaced reinforced shell structure on a mold from laminations of adhesively treated material which includes locating reinforcing members in the recesses provided therefor in the mold, superposing laminations adapted to constitute the shell of said structure on said mold, positioning one or more strips of adhesively treated material on the shell laminations directly over each of said reinforcing members, and subjecting the assembly on the mold to a molding whereby the skin laminations, strips and reinforcing members are bonded together, and removing the thickness of the strip or strips projecting beyond the surface of the shell.

3. A reinforced molded article including in combination an outer shell composed of a plurality of adhesively bonded laminae integrally united by compression, a reinforcing member adhesively bonded to a portion of the inner surface of said shell by compression, an indentation in the outer surface of said shell opposite that area of the inner surface thereof which is in contact with said reinforcing member, said indentation being formed by the compression uniting said shell and reinforcing member, and at least one additional lamina adhesively bonded and molded into the outer surface of said indentation to fill same and make the outer surface of the shell opposite said reinforcing member flush with the adjacent outer surface of the shell.

4. A reinforced molded article including in combination an outer shell composed of a plurality of adhesively bonded laminae integrally united by compression, a reinforcing member adhesively bonded to a portion of the inner surface of said shell by compression, an indentation in the outer surface of said shell opposite that area of the inner surface thereof which is in contact with said reinforcing member, said indentation being formed by the compression uniting said shell and reinforcing member, and at least one additional lamina adhesively bonded and molded into the outer surface of said indentation to fill same, the outer surface of said additional lamina being cut away sufficiently to make same flush with the adjacent outer surface of the shell.

EUGENE L. VIDAL.
LAURENCE J. MARHOEFER.

REFERENCES CITED

The following references are of record in the file of this patent:

UNITED STATES PATENTS

| Number | Name | Date |
| --- | --- | --- |
| 1,912,931 | Clay | June 6, 1933 |
| 2,276,004 | Vidal | Mar. 10, 1942 |